US012102846B1

(12) United States Patent
Pikulik

(10) Patent No.: US 12,102,846 B1
(45) Date of Patent: Oct. 1, 2024

(54) HUMAN RESCUE APPARATUS FOR VERTICAL EXTRACTION IN HIGH TEMPERATURE ENVIRONMENTS

(71) Applicant: William Pikulik, Pointe-Claire (CA)

(72) Inventor: William Pikulik, Pointe-Claire (CA)

( * ) Notice: Subject to any disclaimer, the term of this patent is extended or adjusted under 35 U.S.C. 154(b) by 0 days.

(21) Appl. No.: 18/594,994

(22) Filed: Mar. 4, 2024

(51) Int. Cl.
*A62B 1/18* (2006.01)
*A62B 99/00* (2009.01)
*B66C 1/66* (2006.01)

(52) U.S. Cl.
CPC .................. *A62B 1/18* (2013.01); *B66C 1/66* (2013.01); *A62B 99/00* (2013.01)

(58) Field of Classification Search
CPC .............. A62B 1/06; A62B 1/18; A62B 99/00
USPC ....................................................... 294/82.11
See application file for complete search history.

(56) References Cited

U.S. PATENT DOCUMENTS 4,687,077 A * 8/1987 Bobick .................... A62B 1/10 182/235
11,873,099 B2 * 1/2024 Behrens ................ B66C 13/063
2004/0032140 A1 * 2/2004 Solstad ................... B66C 13/08 294/81.4

FOREIGN PATENT DOCUMENTS

CN 107693964 A * 2/2018
CN 110075434 A * 8/2019 ............... A62B 1/10
CN 116637310 A * 8/2023

* cited by examiner

*Primary Examiner* — Dean J Kramer

(57) ABSTRACT

Provided is a human rescue apparatus that comprises a pulley for vertical extraction of a human using a pulley mechanical advantages system and a fan that is powered by rotation of the pulley to generate airflow in the direction of the user so as to cool the user during vertical extraction when direct aid from rescue workers is typically unavailable. The apparatus has a core mechanism and a support structure. The core mechanism comprises a pulley wheel and a fan coaxially connected together by an axle. The core mechanism is held securely and rotatably in a support structure such that it can freely rotate but otherwise be held by the supporting structure. In some embodiments the supporting structure includes one or more passageway allowing removal of the core mechanism.

10 Claims, 4 Drawing Sheets

HUMAN RESCUE APPARATUS FOR VERTICAL EXTRACTION IN HIGH TEMPERATURE ENVIRONMENTS

TECHNICAL FIELD

The present relates to the field climbing, mountaineering, and rescue equipment. And more particularly the present relates to the field of vertical extraction and rescue equipment. More particularly still the present relates to the field of vertical extraction rescue equipment for high temperature environments.

BACKGROUND

Pulleys are commonly used in climbing and mountaineering and vertical rescue operations. So-called climbing pulleys are commonly used to rescue injured or incapacitated individual that need to be lifted upwards. For example, in mountaineering, crevasse rescue involves extricating a person from a glacier crevasse in which they have fallen. Since a person cannot be easily pulled up even with a rope, pulleys are used to create a mechanical advantage to make it easier to pull the victim up.

Besides glacier crevasses, vertical extraction may be required in a variety of environments. Anywhere where cliffs, crevasses and ravines are found there is a potential for fall accidents requiring vertical extraction. In some settings, the risk of an injury can be compounded by the dangers of exposition. Cold exposition is a danger in glacier terrain but there are many places where heat exposure can put an immobilized victim at risk. In the United States, for example, there are a number of beautiful national parks that feature hikes where cliffs and sun exposure are both natural hazards. If a person has fallen and requires rescue, they may be at risk of overheating, especially if separated from their water during lengthy rescue operations. In such instances, cooling the victim is of critical importance. Rescuers arriving on site may have water and fans for cooling the victim, but once vertical extraction begins, the victim is typically no longer within the reach of the rescuers and therefore stops receiving cooling treatment.

Pulleys are also used recreationally to make ziplines and other play structures. The present inventor, though very young, has enjoyed playing with pulleys in ziplines and simulated vertical extractions in his yard using real climbing equipment. Pulleys used include the common mountaineering so-called "swing side" or "swing cheek" pulley type. Other pulleys used include tandem pulleys that have two pulley wheels that are coplanar and not coaxial. These are used commonly to make the traveller in a zipline, but can also be used to make block-and-tackle or other pulley systems to pull loads with a mechanical advantage.

Fans are devices that are used to generate airflow. Fans typically have a central hub and a plurality of blades disposed around the central hub whose shape and orientation is made to generate flow when the hub is (and therefore the blades are) spun. Such fans are sometimes also called axial fans. The present inventor has acquired a certain experience with fans through an inquisitive mind and an interest for things mechanical and mechanically rotating systems and has amassed a small collection of handheld fans, including both electrical and hand actuated axial fans. Through dismantling and experimentation, the inventor has acquired a rich understanding of how such fans work and the potential that their technology presents.

SUMMARY

Provided are systems, methods and more broadly technology as described herein and claimed below.

In some embodiments is provided a human rescue apparatus for vertical extraction in high-temperature environments. The apparatus comprises a core mechanism, which comprises a pulley wheel rotatably configured to receive and engage with a lifting rope. The core mechanism further comprises an axle extending co-axially from the pulley wheel and connected to the pulley wheel such that rotating the pulley wheel rotates the axle. The core mechanism further comprises a fan assembly comprising a hub having an axis and a plurality of fan blades extending outward from the hub such that rotating the hub about its axis causes the fan blades to turn about the hub's axis, the fan assembly being connected coaxially at the hub to the axle such that turning the axle causes the fan assembly to turn. The apparatus further comprises a support structure rotationally supporting the axle to hold the axle in place while allowing it to freely rotate within the support structure such that the core mechanism is securely held with respect to the support structure but can freely rotate, the support structure comprising an attachment point for securing the human rescue apparatus to a load, the supporting structure extending longitudinally away from the axle to the attachment point such that when the attachment point is connected to the load and the pulley wheel is pulled upwards, the core mechanism is held upwards above the attachment point and the fan assembly can spin with the pulley wheel above the load.

In certain embodiments, the distance in the support structure between the axle and the attachment point is greater than the length of the fan blades such that connecting equipment can be connected at the attachment point without interfering with the spinning of the fan blades.

In certain embodiments, the attachment means is positioned such that upon actuation of the pulley wheel, the fan blades rotate to generate airflow directed towards the face of the person being lifted, thereby providing cooling air during the extraction process.

In certain embodiments the support structure extends away from an axis of rotation of the pulley wheel, and wherein the attachment point is located away from the axis of rotation of the pulley wheel such that if the attachment point is attached to a load and the wheel is pulled upwards, the fan assembly is caused to lift upwards away from the load.

In certain embodiments the attachment point is configured to receive a climbing carabiner angularly and translationally offset to the axis of rotation of the pulley wheel.

In certain embodiments the attachment point is a hole dimensioned for receiving a climbing carabiner.

In certain embodiments the axle extends coaxially away from the pulley wheel on both sides of the pulley wheel. In such an embodiment the support structure may comprise a pair of rigid plates provided on respective sides of the pulley wheel, each of the rigid plates receiving the axle and extending at least partially perpendicularly to the axle from the axle to the attachment point. In such an embodiment, the attachment point comprises a hole in both of the rigid plates. Alternatively, the attachment point may comprise a rigid member extending from one of the rigid plates to the other of the rigid plates, the rigid member being dimensioned to be received within a climbing carabiner. Alternatively still, each of the rigid plates may have a hole for receiving the axle, a longitudinal axis extending between the hole and the attachment point, and a passageway extending from the hole towards the attachment point and towards a longitudinal edge of the rigid plate such that the axle can be inserted into the hole via the passageway and be held securely in the hole when pulled away from the attachment point.

In certain embodiments the apparatus further comprises a cage structure surrounding the fan assembly and connected to the support structure so as to be immobile with respect to at least a portion of the support structure, the cage structure forming a protective barrier around the fan assembly.

In certain embodiments, the support structure securely holds the pulley wheel by securely receiving the axle to which the pulley wheel is connected.

BRIEF DESCRIPTION OF THE DRAWINGS

The present examples will be better understood with reference to the appended illustrations which are as follows.

DESCRIPTION

Herein is provided a human rescue apparatus 100 for vertical extraction in high-temperature environments. The apparatus 100 is adapted to cool a victim while being lifted by means of a pulley system.

Figure 1:
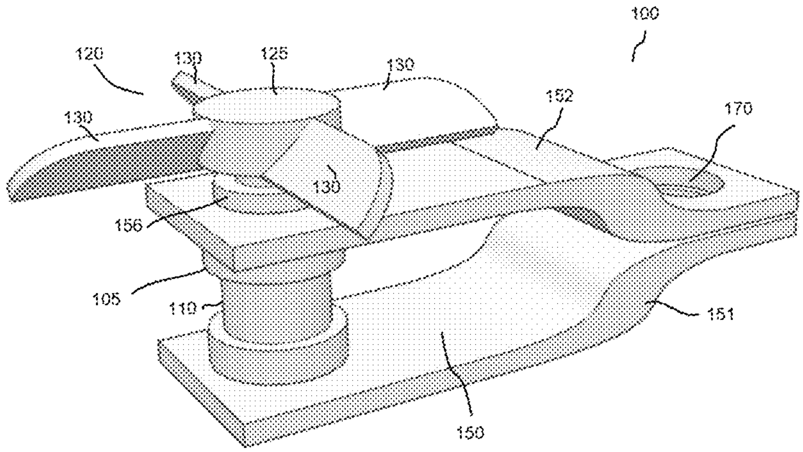
FIG. 1 shows a perspective view of a human rescue apparatus according to a non-limiting embodiment.
Figure 2:
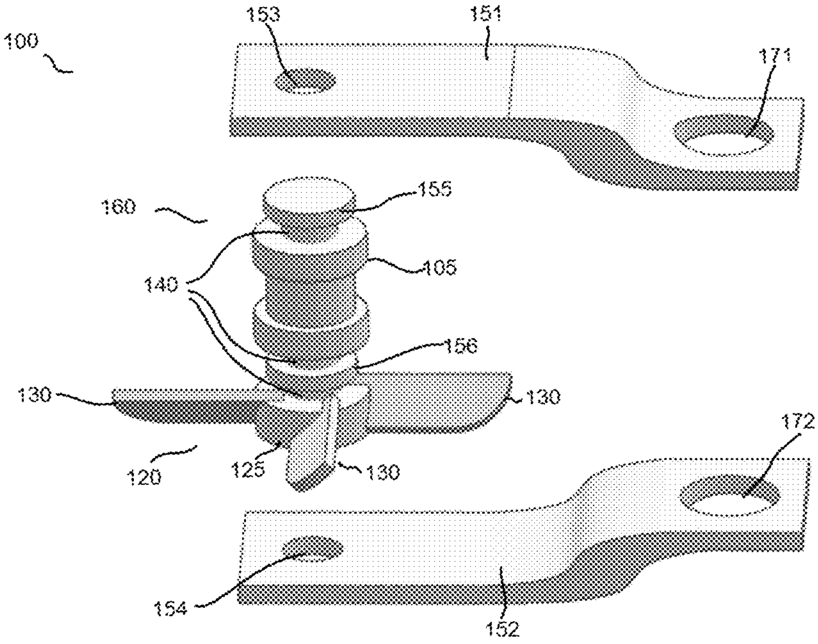
FIG. 2 shows an exploded view of the human rescue apparatus of FIG. 1.
Figure 3:
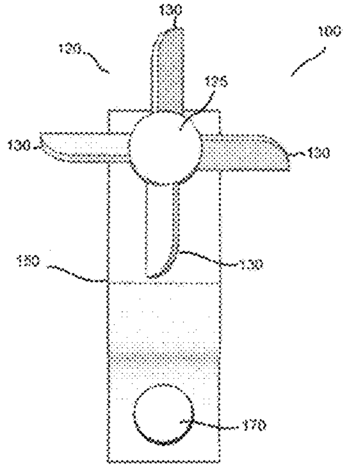
FIG. 3 shows a front elevation view of the human rescue apparatus of FIG. 1.
Figure 4:
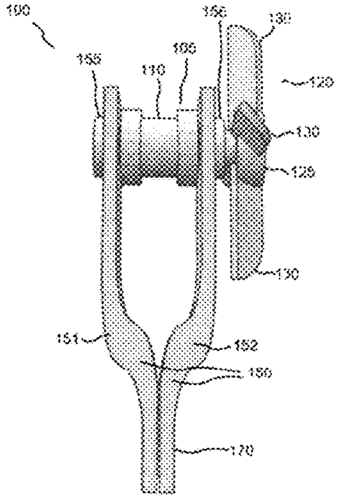
FIG. 4 shows a side elevation view of the human rescue apparatus of FIG. 1.
Figure 9:
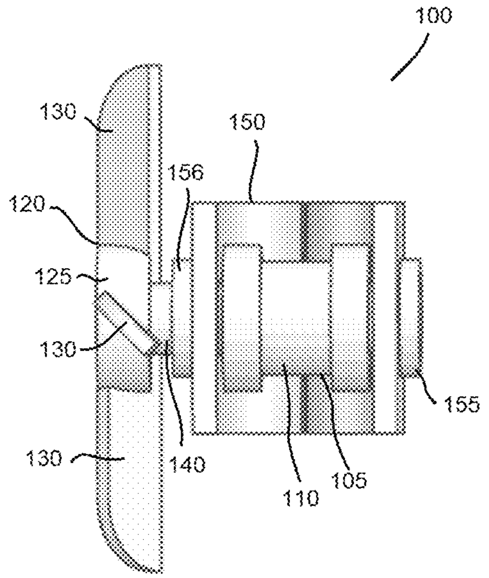
FIG. 9 shows a top plan view of the human rescue apparatus of FIG. 1.
Figure 10:
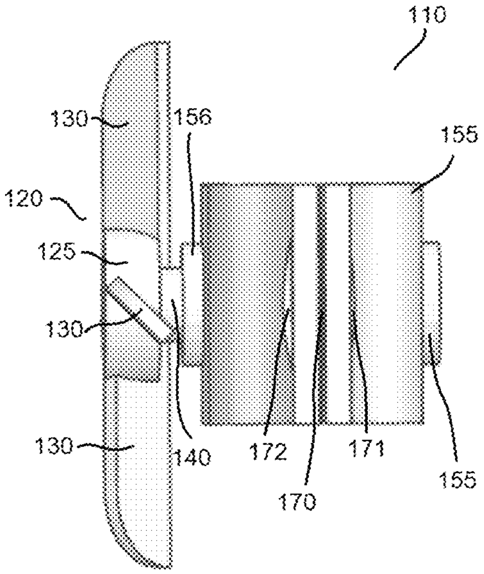
FIG. 10 shows a bottom plan view of the human rescue apparatus of FIG. 1.

FIG. 1 shows a perspective view of the apparatus 100 according to a non-limiting embodiment. The same apparatus 100 is also shown in FIG. 2 in an exploded view, in FIG. 3 in a front elevation view, in FIG. 4 in a side elevation view, in FIG. 9 in a top plan view, and in FIG. 10 in a bottom plan view.

The apparatus 100 comprises a pulley wheel 105 that is dimensioned to receive a rope. To this end, the pulley wheel 105 has a groove 110 in its peripheral edge to receive a rope. Ropes used in mountaineering and vertical rescue commonly have a diameter of 8 mm to 12.5 mm. Accordingly, the groove 110 may be dimensioned to receive a rope of those dimensions.

The apparatus 100 comprises an axial fan 120 comprising a hub 125 and a plurality of fan blades 130. The fan 120 is in mechanical communication with the pulley wheel 105 such that turning the pulley wheel 105 causes the fan 120 to turn.

In the illustrated embodiment, the fan 120 is connected to the pulley wheel 105 by an axle 140. The axle 140 is connected coaxially to the pulley wheel 105 such that the axle 140 and the pulley wheel 105 have a same axis of rotation. The axle 140 is also connected coaxially to the fan 120, and more particularly to the hub 125 such that the axle 140 and the hub 125 have a same axis of rotation. As a result the pulley wheel 105, the axle 140 and the fan 120 are all coaxial and share a common axis of rotation.

Figure 5:
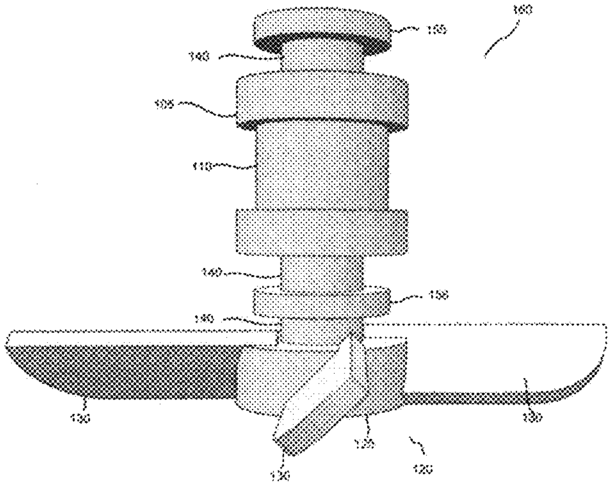
FIG. 5 shows a side elevation view of a core mechanism of the human rescue apparatus of FIG. 1.

The apparatus 100 comprises a support structure 150 that rotatably and securely holds the pulley wheel 105 such that it can rotate about its axis of rotation while being held in place with respect to the support structure 150. In this example, the support structure 150 comprises a pair of rigid plates 151, 152. FIG. 2 shows the rigid plates 151, 152 separated from a core mechanism 160 comprising the pulley wheel 105, the axle 140 and the fan 120. The core mechanism is also shown separately in a side elevation view in FIG. 5.

In this example, the rigid plates 151, 152, are curved to meet at a distal end, away from the core mechanism and its constituent components. By meeting together, the two rigid plates 151, 152 can create an enclosure for containing a rope between them thus preventing the rope from slipping out of the apparatus 100 in use, as long as the rope is not threaded all the way through. Moreover, this geometry also allows for easier clipping of a carabiner or other connector, as will be described below. In this example, the two rigid plates 151, 152 meet in that they approach each other but do not necessarily touch; touching is not absolutely required to achieve advantages of this geometry. Other geometries for the support structure are possible.

In this example, the support structure comprises swing sides, or cheeks, allowing the pulley aspect of the apparatus to operate like a swing side pulley. More specifically, at least one of the rigid plates 151, 152 can pivot about the axle 140, allowing the support structure 150 to open to receive a rope. Advantageously, this means that it is not necessary to thread a rope from one end through the support structure 150, instead the support structure 150 can open allowing a middle segment of the rope to be received inside the support structure 150 to eventually partially surround the pulley wheel 105 in use. The support structure 150 can then be closed again thereby holding the rope in place. In this example, both rigid plates 151, 152, can pivot freely about the axle 140, this freedom also allowing the core mechanism 160 to rotate freely within the confines of the support structure 150, which in turn allows the pulley wheel 105 and fan 120 to rotate freely together.

The support structure 150 is thus rotatably connected to the core mechanism 160, and more particularly to the pulley wheel 105, fan 120 and/or axle 140. More specifically the support structure receives the axle 140 and rotably In this example, the support structure comprises a pair of holes 153, 154, for receiving the axle 140 on either side of the pulley wheel 105. To this end, the axle 140 extends coaxially away from the pulley wheel 105 on either side of the pulley wheel 105. In other words, it extends along the axis of rotation on both sides of the pulley wheel 105. This allows it to be received by the support structure 150 on both sides of the pulley wheel 105, which allows the pulley wheel 105 to be supported on both sides. This may be useful as the pulley wheel 105 in use may support the weight of the load being lifted, which loads can be substantial if the apparatus 100 is used for human rescue.

In the present example, the axle 140 engages with the holes 153, 154 of the support structure 150 and is received therein. Each of the holes 153, 154 receives the axle 140, on respective sides of the pulley wheel 105. More specifically still, in the example shown where the support structure comprises rigid plates 151, 152, each plate is located on respective sides of the pulley wheel 105, and each plate comprises a respective hole 153, 154, each of which receives respective portions of the axle 140. Although not shown in this example, bearing mechanisms may be used to reduce friction, allow smoother rotation, and minimize wear and tear on the moving parts.

Additional mechanisms can be provided to better hold in place the core mechanism 160 and/or constituent parts to the support structure 150 and prevent slipping out, or more generally to prevent translational movement of the support structure with respect to the core mechanism 160 and/or its constituent parts. In this example, retaining structures are provided to prevent movement of the core mechanism 160 with respect to the support structure 150 along its rotational axis. Here, the retaining structure are a pair of protuberances 155, 156 (which can be cylindrical protuberances as shown, or have other geometries) on the axle 140 which respectively prevent rigid plate 151 from slipping out and falling off the core mechanism 160, and rigid plate 152 from slipping towards the fan 120 and interfering with its movement. In the illustrated example, the rigid plates are only bracketed on the outside by the retaining structure because they are naturally bracketed on the inside by pulley wheel 105. However other types and configurations of retaining structures are possible. For example, a groove provided in the axle 140 with holes 153, 154 dimensioned to fit such groove could also be used. In fact, such was the design selected in an early prototype, but it was abandoned in favor of the design shown here in part to allow a thicker axle 140 throughout, which provides more strength to the core mechanism 160, but may not be necessary if stronger materials are used.

Note also that certain retaining aspects of the retaining structure may not be required, e.g. depending on constraints inherent to the support structure 150. For example, if the support structure 150 is unitary, e.g. if two rigid plates meet and are connected at their distal ends, then constraining the movement on one side of the pulley 105 would have the effect of constraining the same movement on the other side. So for example, the retaining structure shown here could be entirely absent provided that the axle 140 is long enough that the pulley wheel 105 prevents the support structure 150 from moving translationally along the axis of rotation far enough to slip out or interfere with the fan 120.

Returning to the illustrated example, the support structure 150 holds the pulley wheel 105 in place and extends away from the axis of rotation to an attachment point 170 towards a distal end of the support structure 150. The attachment point can be any mechanism suitable for attaching to connection equipment, e.g. to attach the apparatus 100 to a harness. In this embodiment, the attachment point 170 is provided by a hole through the support structure 150 through which a carabiner may be attached. The hole may be sized to receive a typical climbing carabiner. For example, a hole of 16 mm-30 mm could easily accommodate a carabiner of 12 mm-14 mm diameter thickness. In the illustrated example, the attachment point 170 has a hole of approximately 28 mm.

In the present example, where the support structure 150 comprises a pair of rigid plates 151, 152, the attachment point 170 comprises a pair of holes 171, 172, one in each of the rigid plates 151, 152. When a carabiner or other connector is attached through the holes 171, 172, the rigid plates 151, 152 are held together at the distal end, which keeps the support structure 150 closed.

In this example, the attachment point receives connection equipment, e.g. a carabiner, at an angle generally parallel to the rotational axis of the core mechanism 160 and constituent components. However the connection equipment is translationally offset to, that is to say not in the same plane as, the rotational axis. Indeed the holes 171, 172 and holes 152, 153 are each in planes that are generally parallel to one another. In alternative embodiments, the attachment point 170 may receive the connecting equipment at an angle angularly offset from the rotational axis but still translationally offset. That is to say that the angle at which it receives the connecting equipment would be transversal to the rotational axis except that it is in a different plane. This would be the case if, for example, the attachment point 170 is oriented at 90 degrees from its current orientation about the longitudinal (lengthwise) axis of the support structure 150 as will be described in an example below. In such a case, a carabiner may be clipped from the side of the apparatus 100 instead of from the front or back.

Other types of attachment mechanisms can be provided for attachment point 170. For example, instead of a hole through each of the rigid plates 151, 152, a connecting member could be provided instead. To this end, the rigid plates 151, 152, may be less curved such that at the distal end they do not meet to leave room for a connecting member to extend from one plate to the other between them. The connecting member could be, for example, a rigid bar. If the connection equipment to be connected at the attachment point is a carabiner, then the connecting member (and therefore distance between the rigid plates at the connecting member) may be dimensioned to be longer than the thickness of a carabiner, e.g. it may be 16 mm-30 mm long, so that there is enough room between the rigid plates 151, 152 to receive a carabiner. The connecting member may be thick enough to be structurally strong, yet not too big to fit within the gate of a typical carabiner. To this end, it may be cylindrical and made of thickness similar to a typical carabiner, particularly if of similar material, e.g. 12 mm-14 mm which would easily fit within a carabiner having an open gate size of 17 mm-24 mm.

The connecting member in this variant would allow a carabiner to be connected more or less perpendicularly to the way a carabiner would connect to the example of FIG. 1. This may be useful for certain types of harnesses. Depending on the orientation of the connection loop of a harness, a carabiner clipped into the harness may naturally hold a position perpendicular to the longitudinal axis of the wearer (that is with the gate facing the left or right side from the wearer's perspective), or a position parallel to the longitudinal axis of the wearer (that is with the gate facing towards the head or the feet of the wearer). The example of FIG. 1 may be ideal for the latter type of harness, since the fan in such a case will naturally align with the axis of rotation parallel to the wearer's longitudinal axis thus allowing the fan to be oriented towards the face and head of the wearer. For the former type of harness, the variant example with a connecting member instead of holes 171, 172 may similarly allow the fan to be oriented towards the wearer's face and head.

The examples illustrated here show only some of the esthetic design possibilities of the present invention. Of course for more visually appealing designs, the connecting member, if present, needs not be straight line cylinder connecting one rigid plate 151, to the other 152, but instead the entire support structure 150 may be shaped to gradually transition from a plate-like shape at the pulley wheel 105 to a carabiner-like curved member at the distal end. In fact in any of the embodiments here described, the support structure can vary significantly in appearance. For example in the example of FIG. 1, the rigid plates 151, 152 can be shaped like a carabiner-like cylindrical body, surrounding the axle 140, e.g. by enlarging around the axle 140, (and perhaps containing a bearing mechanism there) and extending towards the attachment point which may be formed by a loop in the cylindrical body or by an enlargement and hole in the body. In short, the reader should understand that esthetic variations are possible.

Optionally the apparatus in any variant, may be equipped with a pivoting mechanism allowing the attachment point 170 to pivot with respect to the fan 120 so as to be able to orient the fan towards the face of the user. For example, the distal end of the support structure 150 comprising the attachment point 170 may be connected to the rest of the support structure 150 by a rotating structure such as a swivel or rotating shackle. Optionally, a locking mechanism can be included to prevent rotation when the proper angle is found. For example, a screw lock or pin lock may be used. Optionally, a load-sensitive locking mechanism may be implemented that locks the rotating structure in place when a load is applied to the apparatus. For example, a friction lock may be implemented that increases the friction between the components of the rotating structure that rotate relative to one another under load. This may be achieved using a convex conical surface on one side of the rotating structure and a concave conical surface on the other (dimensioned to receive the convex conical surface snugly) such that as a load is applied, the two surfaces are pressed against each other and create friction preventing rotation. Such a design allows placement of the fan relative to the user before loading and holds the fan in place once the load is applied. Alternatively, if no rotating structure is provided, extra equipment may be used to add a 90 degree turn to the carabiner connection, such as a small rigging plate with a 90 degree angle between connection holes or simply using a chain of two carabiners, although it should be noted that daisy-chained carabiners may sometimes twist since they are not held rigidly at 90 degrees from one another, making this solution somewhat less ideal for orienting the fan 120.

The support structure 150 is dimensioned to allow connection of connecting equipment, such as a carabiner, away from the fan blades 130 so as to avoid interfering with the rotation of the fan blades. To this end, the supporting structure may curve away from the plane in which the fan blades 130 turn, as is the case in FIG. 1. But it may be even more useful for the support structure to extend away from the core mechanism 160 and its constituent parts, particularly the fan 120 and fan blades 130, such that the connecting equipment (e.g. carabiner) may be connected beyond the reach of the fan blades 130. This too is the case in FIG. 1. Thus the length of the support structure 150, and particularly the distance between the connection to the core mechanism 160 (in this case holes 153, 154) and the attachment point 170, may be selected to prevent interference between the fan blades 130 and the connection equipment.

Moreover the length and shape of the support structure 150 serves to keep the fan positioned above the harness and the blades 130 safely away from the user and at the right height to direct air towards their face. Indeed by extending away from the core mechanism 160 and its constituent parts, and from the rotational axis of the pulley wheel 105 and the fan 120, the supporting structure puts distance between the attachment point 170 and the pulley wheel 105 and holds them apart. As a result, when the attachment point is connected to the harness of a user, and a rope is looped around the pulley wheel 105 and pulled upwards, the pulley wheel 105, along with the rest of the core mechanism 160 including the fan 120 is lifted up above the attachment point 170, which is held downwards by the load, in this case a user wearing a harness that has been attached to the apparatus 100 at the attachment point 170, e.g. using a carabiner.

Figure 8:
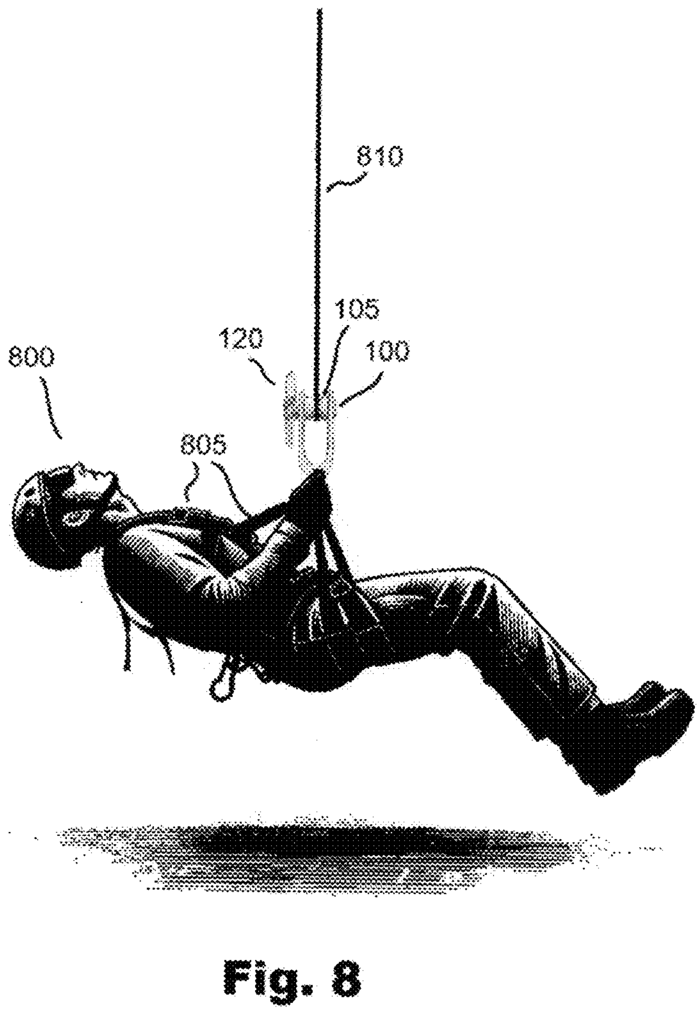
FIG. 8 shows a side elevation view of the human rescue apparatus of FIG. 1 in use during vertical extraction.

In a rescue scenario where a victim needs to be extracted vertically, the victim is typically provided a full-body harness (which can in practice be made up of multiple parts such as a combination of chest and seat harness). Such a full-body harness typically has a connection point such as a belay loop at roughly chest level. Generally speaking, someone lifted from this connection point will have their body weight distributed such that they are generally horizontal with their head and shoulders slightly up and their waist and pelvis slightly down, which may be a desirable position for comfort and safety. FIG. 8 shows a user 800 with a harness 805 being lifted by a rope 810 via the apparatus 100 of FIG. 1. As shown, the apparatus 100 is attached to the harness and the rope 810 lifts the pulley wheel 105 and therefore the fan 120 up above the attachment point 170 holding the fan at approximately head and face height.

To this end the support structure 150 may have a length adapted to hold the fan the right height above the harness to blow air towards the head and face of the user. This may be, for example, between 100 mm and 200 mm. In the example of FIG. 1, the support structure 150 is 157 mm in length (in the plane of the axle-receiving section) with 139 mm (in the same plane) between the opposite edges of the axle-receiving hole and attachment point hole. This combined with an ordinary carabiner, which may have a typical length of 90 mm-120 mm and an ordinary full-body harness, was found to hold the center of the fan 120 at approximately face height for an adult user in a comfortably reclined position. The exact height of the fan 120 relative to the head of the user depends, of course on many factors, including the orientation of the body of the user (e.g. level of inclination), the height of the user, the type and tightness of the harness worn, and other factors. But advantageously, the fan 120 creates a broad airflow pushing air generally in the axial direction, that is to say in a direction along the rotational axis of the fan, but with dispersion such that it may be felt even if the fan 120 is not perfectly aimed at the user's face.

The supporting structure 150 may also be dimensioned as a function of the fan 120 and more particularly the fan blades 130, as mentioned above. In particular, the supporting structure may be dimensioned to be longer than the fan blades 130 and more particularly still, the distance in the supporting structure 150 between the axle 140 and the attachment point 170 may be made longer than the fan blades such that connecting equipment, e.g. a carabiner, can be connected at the attachment point without interfering with the spinning of the fan blades. Longer fan blades 130 can be provided to generate greater airflow. The number of fan blades 130 and the geometry of the fan blades 130 can also affect effectiveness and airflow generated, and the fan blades 130 can be modified accordingly. In the illustrated example the fan blades have a length of 40 mm and the distance between the outer edges of the hole 153 and hole 171 in rigid plate 151 is 139 mm in the plane of the hole 153, which is leaves plenty of room between the fan 120 and a connected carabiner. The same is true for the distance between hole 154 and hole 172 in rigid plate 152. The fan 120 of the illustrated design generates some airflow, but greater airflow could be achieved with bigger and/or more effectively shaped fan blades 130, the exact design of which may be selected based on literature in the art of fan design. The fan blades 130 can be made longer until they reach a length when they interfere with the surrounding equipment, e.g. the carabiner at the attachment point 170. If this happens longer fan blades still can be supported by lengthening the supporting structure 150, but this will also lift the hub 125 and the center of airflow higher, potentially away from the face of the user. Therefore a balance may be reached between the fan blade size and length of the supporting structure. In the example of FIG. 1, it was found that the fan blades 130 could be up to 80 mm long without interfering with a carabiner at the attachment point 170. So in some embodiments the fan blades 130 may be between 40 mm and 80 mm long.

The configuration for the apparatus 100 shown in FIGS. 1-5 has the advantage of being particularly secure insofar as the core mechanism 160 is securely held by the support structure 150. However, it the application of assembly methodology since there is no direct way to connect the pieces together, the core mechanism 160 being too big to slip through the holes 153, 154 to insert the axle 140 into place. Any known assembling technique may be used. For example, the core mechanism may be build from several parts, held together by suitable means upon assembly. For example, the pulley wheel 105 may be connectable to the axle 140 on the fan side by taper lock mechanism, and the protuberance 155 may likewise by connectable to the axle 140 on its side of the pulley wheel 105 by taper lock mechanism and the entire core mechanism may then be held together by a fastener such as long bold going through the entire length along the axis of rotation and held in place by a nut and washer at the far end.

Figure 6:
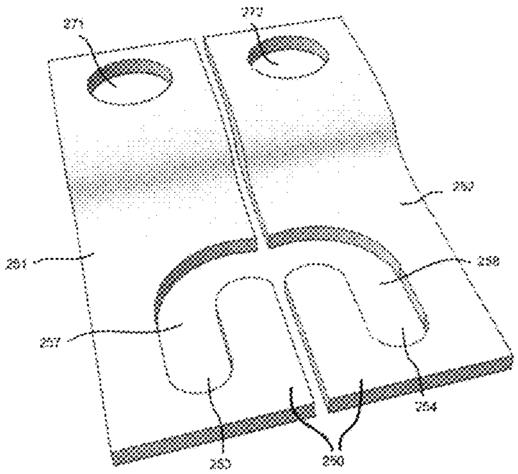
FIG. 6 shows a perspective view of a pair of rigid plates for a human rescue apparatus according to another non-limiting embodiment.
Figure 7:
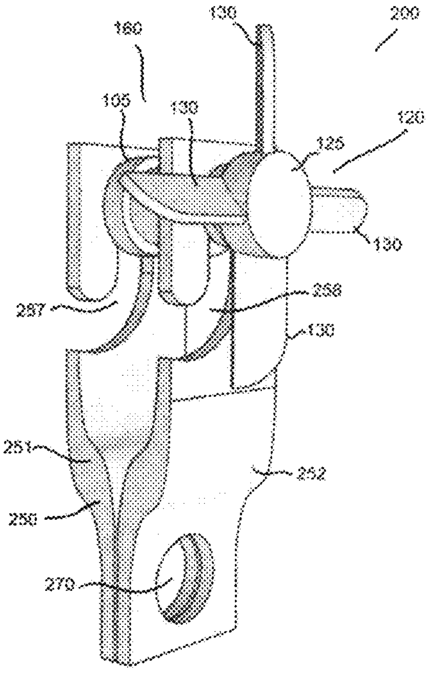
FIG. 7 shows a perspective view of a human rescue apparatus having the rigid plates of FIG. 6.

FIGS. 6 and 7 illustrate a variant which allows easier assembly and disassembly of the support structure 150 with the core mechanism 160. This variant was used for prototyping and may have advantages in applications where rapid assembly and disassembly of the apparatus is desired, particularly if the load on the pulley is expected to stay constant. In this embodiment, a human rescue apparatus 200 comprises a different support structure 250 but the same core mechanism 160 as in the example of FIG. 1. The support structure 250 comprises an attachment point 270 that is similar to attachment point 170.

FIG. 6 shows a pair of rigid plates 251, 252 making up the support structure 250, which resemble rigid plates 151, 152. Like their counterparts, rigid plates 251, 252 have respective holes 253, 254, which serve the same purpose as holes 153, 154, however in this embodiment respective passageways 257, 258 extend from the holes 253, 254 to an edge of their respective rigid plates 251, 252 to allow the slotting in of the axle 140 within the holes 253, 254. The rigid plates 251, 252 further comprise respective holes 271, 272 making up the attachment point 270 as in the Example of FIG. 1.

As described above, in use the pulley wheel 105 and the connected components making up the core mechanism 160 are pulled upwards away from the attachment point 170. If the passageways 257, 258 extend initially from the holes 253, 254, respectively, towards the attachment point 270 (in this example towards holes 271, 272, respectively), then if the axle 140 is received in the holes 253, 254, the passageways 257, 258 will, in use, be oriented away from the direction of pull of the axle 140 on the support structure 250 such that here will be no risk of the axle 140 falling out through the passageways 257, 258. FIG. 7 shows the apparatus 200 assembled.

In order to be able to slot the axle 140 into the passageways 257, 258, the passageways 257, 258 lead to an edge of the rigid plates 251, 252. To this end, the passageways 257, 258 curve towards a longitudinal edge of the support structure 250, specifically towards respective longitudinal edges of the rigid members 251, 252. In this example the curve is round, but this could be achieved with a sharp angle (e.g. a right angle). Moreover, additional meandering or curves may be provided to limit the chances of the core mechanism 160 slotting out of the holes 253, 254 and passageways 257, 258 unintentionally when the apparatus 200 is not in use.

Besides ease of assembly, the example of FIGS. 6 and 7 have the advantage of allowing the orientation of the fan 120 to be flipped easily simply by slotting out the core mechanism 160 from the supporting structure 250, flipping it around and reslotting it in. The components described herein may be made of any suitable material. There exists literature and teachings on materials used in climbing equipment which can inform a design choice. The prototype shown in FIG. 7 was 3D printed using PLA filament and found experimentally to support the weight of an adult, however commercial designs may use stronger and more resilient materials as you would find in a commercially available mountaineering or rescue pulley and in a commercially available personal fan. For example, the supporting structure, axle and pulley wheel may be made of aluminum or steel, with bearing systems connecting the moving parts together, and the fan may be made of softer material to prevent injury in case of contact with human limbs. For example, the hub of the fan may be made of rigid plastic fastened to the axle by suitable fasteners, e.g. bolts or screws pressing into the axle or going through the axle, while the fan blades may be made of soft plastic that yields under pressure to further reduce the chances of injury in case of contact with human appendages.

Although not shown here, a cage structure may be provided around the fan 120 to further prevent injury by human contact with moving parts. The cage structure may be connected to the support structure 150 or 250 to keep the cage immobile with respect to the support structure 150, 250 (or at least a portion thereof, for example if the support structure contains two rigid members, the cage structure may be connected to only the rigid member closest to the fan), such that as the fan 120 turns, the cage structure does not turn. Cage structures are already commonly provided around fans for personal use. Such a design can be adapted for use in the invention described herein by connecting it to the supporting structure of a human rescue apparatus.

Along with a cage structure, the supporting structure 150 may include side walls for blocking access to the pulley wheel 105 and prevent fingers or hair from getting caught in it. This may be useful for rescue equipment, where the user may not necessarily be familiar with climbing gear and may not know to keep their fingers away from the pulley.

Optionally, an anti-slip surface can be applied to the pulley wheel 105 and particularly to the groove 110 to create friction between the rope and the pulley wheel 105 and so limit slippage of the rope against the pulley wheel 105. This both protects the rope and mechanism from friction wear and heat, and also helps ensure that the pulley wheel 105 turns thereby turning the fan 120. In prototyping, rubber from a rubber band was found to have create good friction between rope and pulley wheel 105 but other materials and treatments can be used. Moreover lubricants were found to help with rotation of the core mechanism 160, pulley wheel 105, and more specifically the axle 140 within the support structure 150, and mores specifically the holes 153, 154.

In the illustrated examples, the groove has a faceted groove profile meaning that it a linear segmented and angular cross-sectional profile but in other embodiments, the groove could be a smooth curved cutout with a rounded cross-sectional profile as is common in climbing pulleys.

While the invention was described in the context of rescue operations the reader will appreciate that the technology described herein can be used in other contexts. For example, the inventor found his creation to be delightful toy in simulated rescue and play vertical extractions. Moreover while the invention was described in the context of cooling a human user, it will be appreciated that the present invention could be used to generate airflow around, by, or towards any load lifted using a pulley system connected to it, or indeed anything connected to a pulley in use.

Although the above description has been provided with reference to specific example, this was for the purpose of illustrating, not limiting, the invention. Variants as may be understood by the skilled person as being within the scope of the claims are intended to be within the scope of the present inventions which is defined by the following claims.

The invention claimed is:

1. A human rescue apparatus for vertical extraction in high-temperature environments comprising:

a. a core mechanism comprising:
   i. a pulley wheel rotatably configured to receive and engage with a lifting rope,
   ii. an axle extending co-axially from the pulley wheel and connected to the pulley wheel such that rotating the pulley wheel rotates the axle,
   iii. a fan assembly in mechanical communication with the pulley wheel and comprising a hub having an axis and a plurality of fan blades extending outward from the hub such that rotating the hub about its axis causes the fan blades to turn about the hub's axis, the fan assembly being connected coaxially at the hub to the axle such that turning the axle causes the fan assembly to turn, b. a support structure rotationally supporting the axle to hold the axle in place while allowing it to freely rotate within the support structure such that the core mechanism is securely held with respect to the support structure but can freely rotate, the support structure comprising an attachment point for securing the human rescue apparatus to a load, the supporting structure extending longitudinally away from the axle to the attachment point such that when the attachment point is connected to the load and the pulley wheel is pulled upwards, the core mechanism is held upwards above the attachment point and the fan assembly can spin with the pulley wheel above the load.

2. The human rescue apparatus of claim 1, wherein the distance in the support structure between the axle and the attachment point is greater than the length of the fan blades such that connecting equipment can be connected at the attachment point without interfering with the spinning of the fan blades.

3. The human rescue apparatus of claim 1, wherein the attachment point is positioned such that upon actuation of the pulley wheel in use, the fan blades rotate to generate airflow directed towards the face of the person being lifted, thereby providing cooling air during the extraction process.

4. The human rescue apparatus of claim 3, wherein the attachment point is configured to receive a climbing carabiner angularly and translationally offset to an axis of rotation of the core mechanism.

5. The human rescue apparatus of claim 1, wherein the attachment point is a hole dimensioned for receiving a climbing carabiner.

6. The human rescue apparatus of claim 1, wherein the axle extends coaxially away from the pulley wheel on both sides of the pulley wheel.

7. The human rescue apparatus of claim 6, wherein the support structure comprises a pair of rigid plates provided on respective sides of the pulley wheel, each of the rigid plates receiving the axle and extending at least partially perpendicularly to the axle from the axle to the attachment point.

8. The human rescue apparatus of claim 7, wherein the attachment point comprises a hole in both of the rigid plates.

9. The human rescue apparatus of claim 7, wherein each of the rigid plates has a hole for receiving the axle, a longitudinal axis extending between the hole and the attachment point, and a passageway extending from the hole towards the attachment point and towards a longitudinal edge of the rigid plate such that the axle can be inserted into the hole via the passageway and be held securely in the hole when pulled away from the attachment point.

10. The human rescue apparatus of claim 1, wherein the support structure securely holds the pulley wheel by securely receiving the axle to which the pulley wheel is connected.

* * * * *